(12) United States Patent
Kariya et al.

(10) Patent No.: US 8,240,676 B2
(45) Date of Patent: Aug. 14, 2012

(54) PISTON RING

(75) Inventors: Tomotaka Kariya, Saitama (JP);
Hideshi Hitosugi, Saitama (JP); Makoto Tsuruta, Yokohama (JP)

(73) Assignees: Nippon Piston Ring Co., Ltd., Saitama-Shi (JP); STT Inc., Tokyo (JP)

( * ) Notice: Subject to any disclaimer, the term of this patent is extended or adjusted under 35 U.S.C. 154(b) by 954 days.

(21) Appl. No.: 12/280,904

(22) PCT Filed: Feb. 27, 2007

(86) PCT No.: PCT/JP2007/053677
§ 371 (c)(1),
(2), (4) Date: Aug. 27, 2008

(87) PCT Pub. No.: WO2007/099968
PCT Pub. Date: Sep. 7, 2007

(65) Prior Publication Data
US 2009/0058014 A1    Mar. 5, 2009

(30) Foreign Application Priority Data
Feb. 28, 2006  (JP) .................................. 2006-053781

(51) Int. Cl.
*F16J 9/26*   (2006.01)
(52) U.S. Cl. ....................................................... 277/434
(58) Field of Classification Search .................. 277/434, 277/440, 442
See application file for complete search history.

(56) References Cited

U.S. PATENT DOCUMENTS

| | | | |
|---|---|---|---|
| 4,703,076 A * | 10/1987 | Mori | 524/420 |
| 2007/0297704 A1 | 12/2007 | Mayston et al. | |
| 2009/0143262 A1 * | 6/2009 | Kawata | 508/256 |
| 2011/0098409 A1 * | 4/2011 | Burch et al. | 524/600 |

FOREIGN PATENT DOCUMENTS

| | | |
|---|---|---|
| JP | 46-021681 | 7/1971 |
| JP | 6-248490 | 9/1994 |
| JP | 7-063266 | 3/1995 |
| JP | 08-239682 | 9/1996 |
| JP | 10-246149 | 9/1998 |
| JP | 11-246823 | 9/1999 |
| JP | 2000-169738 | 6/2000 |
| JP | 2006-152274 | 6/2006 |
| WO | WO 94/23193 | 10/1994 |
| WO | WO 2004/003246 | 1/2004 |
| WO | 2004/113749 | 12/2004 |

OTHER PUBLICATIONS

Dictionary of Engineering Plastic; published by Gihodo Shuppan Co., Ltd.; published Dec. 15, 1988.
Product Information of Copper Power for Conductive Paste, web site of Nippon Atomized Maetal Powers Corporation.

* cited by examiner

*Primary Examiner* — Gilbert Lee
(74) *Attorney, Agent, or Firm* — Young & Thompson

(57) ABSTRACT

There is provided a piston ring which can effectively prevent aluminum adhesion phenomenon to the piston ring.
The piston ring includes a piston ring main body and a surface coating film on either upper or lower surface of the piston ring main body, or both the upper and lower surfaces of the piston ring. The surface coating film includes heat-resistant resin and copper based powder contained therein.

18 Claims, 6 Drawing Sheets

Surface coating film
Chemical conversion treatment layer
Piston ring main body

SEI

PISTON RING

TECHNICAL FIELD

The present invention relates to a piston ring used for an internal combustion engine and especially, relates to a piston ring which can effectively prevent adhesion (deposition) phenomenon of aluminum to a piston ring.

TECHNICAL BACKGROUND

Generally, a compression ring and an oil ring are attached as a set of a piston ring to a piston that performs reciprocating motion. The compression ring possesses a function to prevent a phenomenon that high-pressure combustion gas flows into a crank room side from a combustion room side (blow-by). On the other hand, the oil ring mainly possesses a function to suppress a phenomenon that excess lubricant on the inner wall of a cylinder enters into the combustion room side from the crank room side to be consumed (oil-up). Moreover, as a combination of a conventional standard piston ring, a combination of three rings having two compression rings, which include a top ring and a second ring, and one oil ring has been known.

Recently, along with the weight saving and high power output of an internal combustion engine, quality required to a piston ring has been becoming higher. Conventionally, as a method to improve durability of a piston ring for an internal combustion engine, wear resistance surface treatment such as nitriding treatment, ion-plating treatment, or hard chrome plating treatment has been performed on a sliding surface.

Among these surface treatments, because nitriding treatment shows especially excellent wear resistance properties, is has attracted attention as a surface treatment for a piston ring used under harsh operating conditions and has been widely used.

Figure 1:
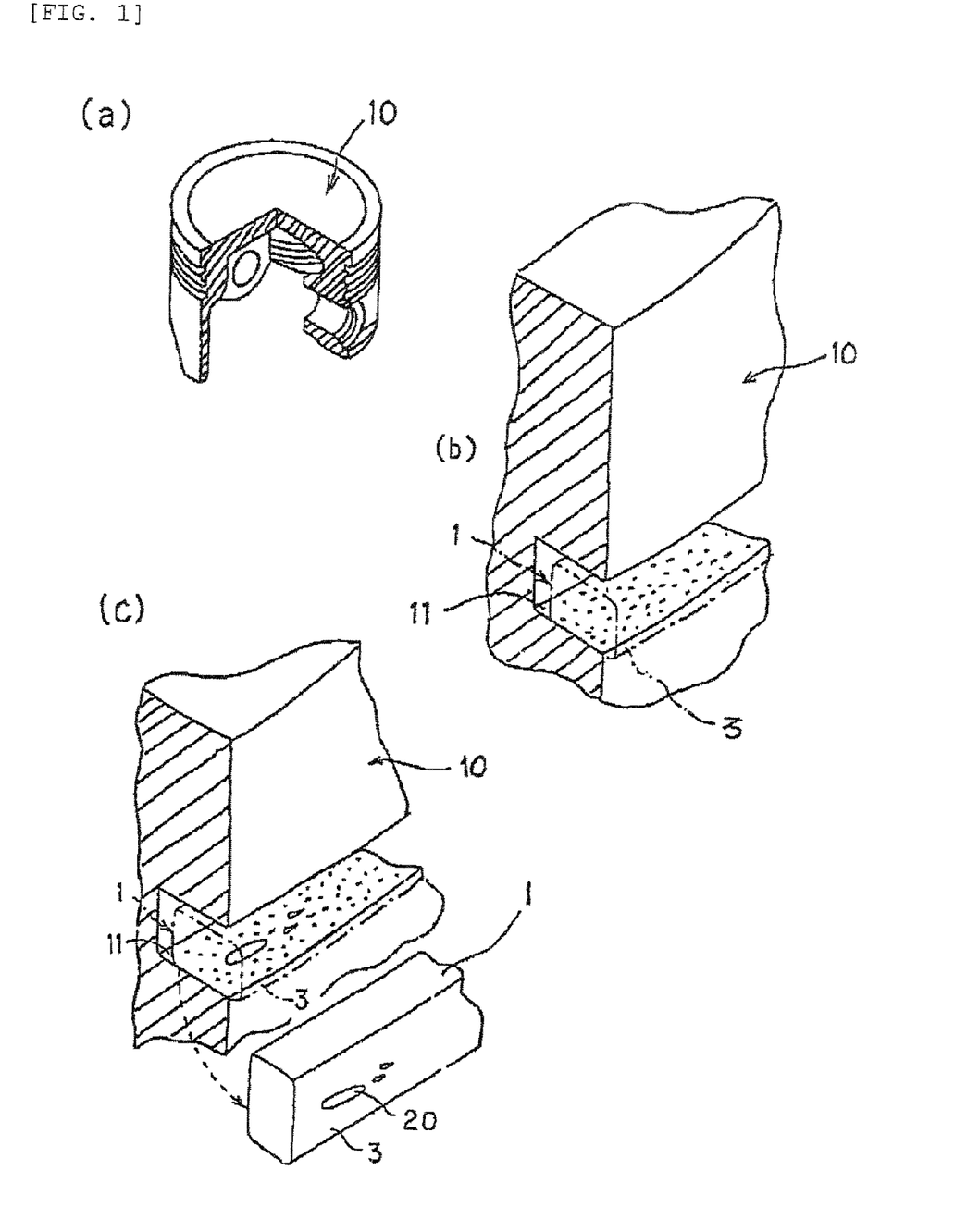
FIG. 1 These are explanatory views of aluminum adhesion phenomenon and (a) is a perspective view of a piston, (b) is an enlarged perspective view of a ring groove of a piston and a piston ring, and (c) is an enlarged perspective view showing aluminum adhesion to a piston ring.

However, though a piston ring on which a nitriding treatment layer has been formed has good wear resistance properties, when mounted on an aluminum alloy piston, it has a tendency to increase wear of ring groove of the piston. Moreover, due to the wear of ring groove of the piston, as shown in FIGS. 1 (a) to (c), aluminum adhesion in which aluminum of lower surface of groove 11 of an aluminum alloy piston 10 adheres on a lower surface 3 of a piston ring 1 (FIG. 1(c)) occurs.

Figure 2:
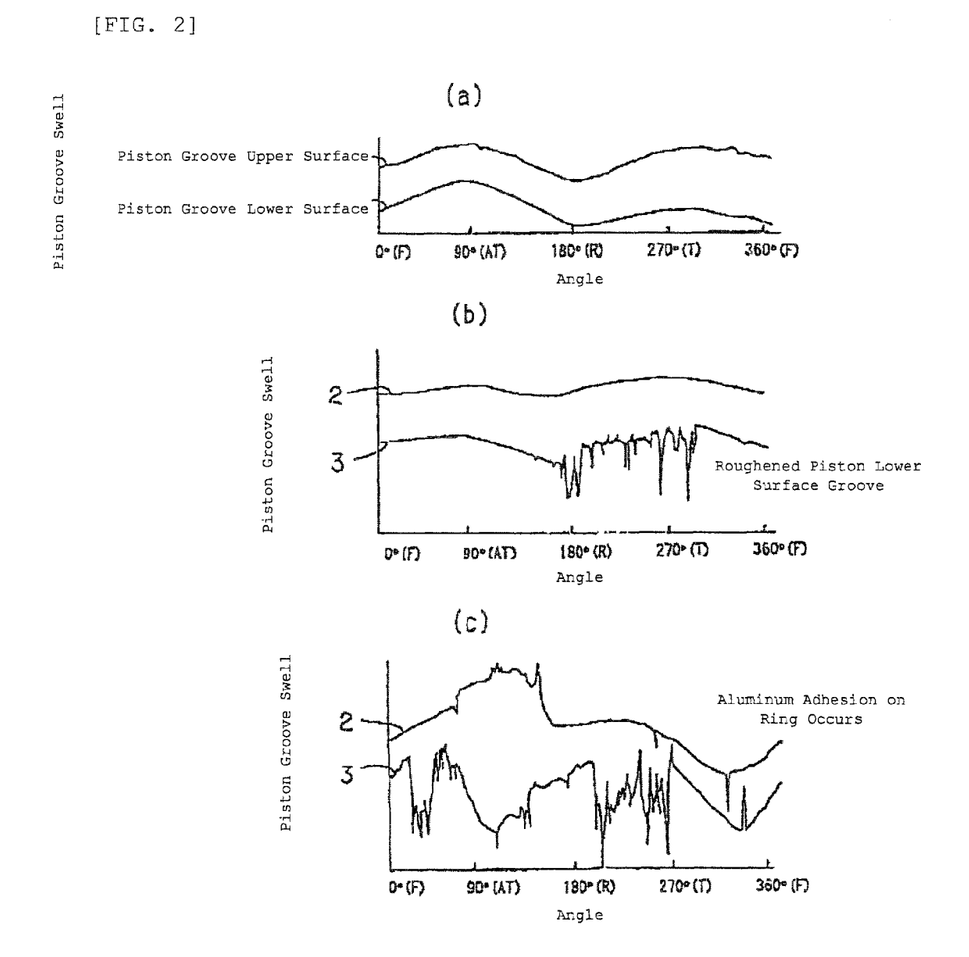
FIG. 2 (a) to (c) show changing state of upper and lower surfaces of a ring groove of a piston.

FIGS. 2(a) to (c) are charts showing the changes of surface roughness of an upper surface 2 and the lower surface 3 of a ring groove of a piston which were detected by a tracer type surface roughness test machine. As shown in FIG. 2, surface condition of the upper surface 2 and the lower surface 3 of the ring groove of the piston changes from normal condition (FIG. 2 (a)) to a roughened piston groove condition (FIG. 2 (b)) to aluminum adhesion condition (FIG. 2 (c)).

Note that in any of FIGS. 2 (a) to (c), horizontal axis show position of a piston and vertical axis show swell of the piston groove. (F) in the figures stands for front direction, while (AT) is for anti-thrust direction, (R) is for rear direction, and (T) is for thrust direction.

Figure 3:
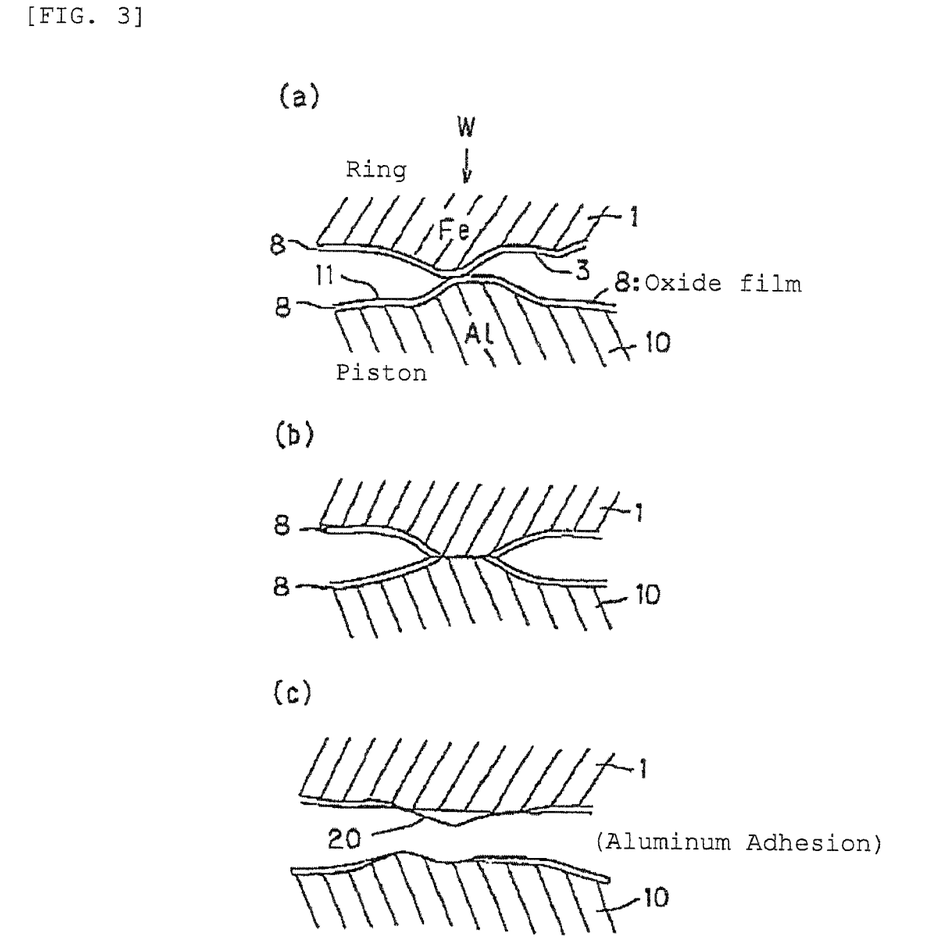
FIG. 3 (a) to (c) are cross-sectional views showing mechanism of aluminum adhesion.
Figure 4:
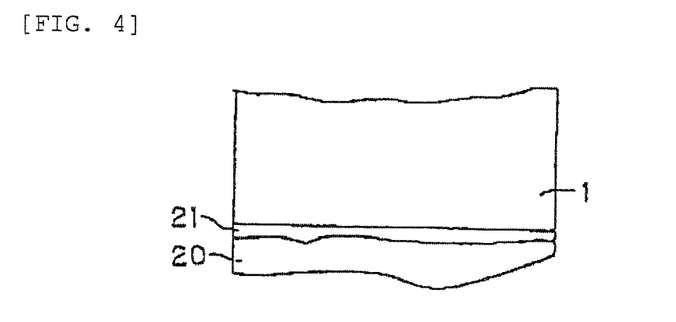
FIG. 4 This is an enlarged view of a portion where aluminum adhesion occurs.

Moreover, FIGS. 3 (a) to (c) show aluminum adhesion mechanism. The lower surface 3 of the piston ring 1 and the lower surface of groove 11 of the aluminum alloy piston 10 comes into contact with each other via oxide films 8 (0.2 μm or below) formed on the surfaces respectively (FIG. 3 (a)), then stress of the oxide films 8 on contacting portions becomes high locally to break the oxide films 8, thus uniting Fe of the lower surface 3 of the piston ring 1 and Al of the lower surface of groove 11 of the aluminum alloy piston 10 (FIG. 3 (b)), and aluminum alloy 20 is deposited on the lower surface 3 of the piston ring 1. Note that enlarged view of the aluminum adhesion portion is shown in FIG. 4. In FIG. 4, reference numeral 20 is aluminum that is adhered and reference numeral 21 is joint part of Al and Fe.

As described above, when partial wear (also known as roughened piston groove) due to the adhesion phenomenon on a certain part of a groove of a piston occurs along with the up and down movement of a piston ring, sealing property of an internal combustion engine is deteriorated by blow-by of blow-by gas, leading to lowered output power. This phenomenon occurs within a short period of time in the lower side of a ring groove of a piston and influences durability of the internal combustion engine much. Therefore, many countermeasures against wear of piston groove have been conventionally proposed.

Figure 5:
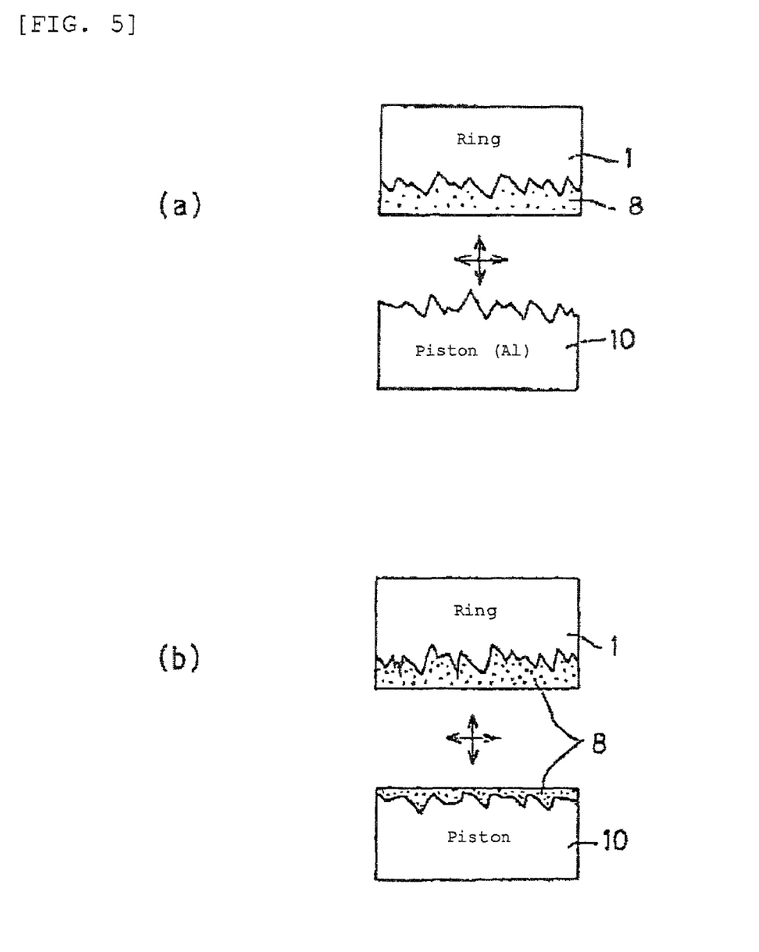
FIG. 5 This is a cross-sectional view showing conventional resin coating treatment.

For example, to prevent direct contact between a piston and a piston ring, as a countermeasure against wear of piston groove, anodic oxide coating treatment, coating treatment, or matrix toughening treatment (inside of a piston) has been performed for a piston, while phosphate coating treatment or coating treatment has been performed on a piston ring. Or, as shown in FIGS. 5 (a) and (b), resin coating treatment 8 has been performed on the surface of a piston 10 and a piston ring 1 (for example, Defric (manufactured by Kawamura Research Laboratories)).

Moreover, to solve the above-mentioned problem, a piston ring on which upper and lower surfaces or on lower surface, wear resistance treatment layer of nitrided layer or chrome plating layer is formed and upon that wear resistance treatment layer, polybenzimidazole resin film which includes solid lubricant has been developed (refer to Patent Reference 1).

In addition, a piston ring of which surface is coated by heat-resistant resin which includes solid lubricant has been developed by someone other than the applicant of the present application (for example, refer to Patent References 2 and 3).

Patent Reference 1: Japanese Published Unexamined Patent Application No. 07-063266
Patent Reference 2: Japanese Published Unexamined Patent Application No. 10-246149
Patent Reference 3: Japanese Published Unexamined Patent Application No. 11-246823

DISCLOSURE OF THE INVENTION

Problems to be Solved by the Invention

However, though the above-described conventional countermeasures against wear of piston groove have an effect to prevent adhesion of aluminum in the early stage of piston use, their mid and long term life is not well considered. Therefore, more improvement on durability is desired.

More specifically, for example, in the Patent Reference 1, surface coating by use of polybenzimidazole resin and solid lubricant (C or $MoS_2$) has been disclosed. However, polybenzimidazole resin is easily oxidized when it is in liquid resin state used to form a film and also deteriorates as time elapses. Therefore, it must be carefully used. Moreover, in some cases, it is difficult to stabilize the quality for a long period of time.

Furthermore, in the Patent Reference 2, surface coating by polyamide-imide resin or polyimide resin and solid lubricant (graphite, $MoS_2$, $WS_2$, or polytetrafluoroethylene) has been disclosed. However, such surface coating cannot sufficiently prevent aluminum adhesion and also high cost for coating becomes a problem.

In addition, in the Patent Reference 3, surface coating by polyamide-imide resin or polyimide resin and $MoS_2$ as a solid lubricant and antimony oxide has been disclosed. However, surface coating by this combination also cannot sufficiently prevent aluminum adhesion. Moreover, since antimony oxide is harmful to environment, it is not preferable to use it.

The present invention has been made in consideration of such a condition and is aimed at providing a piston ring which can effectively prevent aluminum adhesion to the piston ring.

Means for Solving Problem

The present invention to solve the above-mentioned problems is a piston ring which includes a piston ring main body and a surface coating film on either upper or lower surface of the piston ring main body, or both the upper and lower surfaces the piston ring wherein the surface coating film comprises heat-resistant resin and copper based powder contained therein and rate of content of the copper based powder in the whole of the surface coating film is between 20 and 80% by mass.

Moreover, in the piston ring, the copper based powder may by any of pure copper, copper oxide, or copper alloy.

In addition, in the piston ring, the copper based powder has a scale-like shape in powder and an average particle diameter thereof may be between 8 and 12 µm.

Furthermore, in the piston ring, specific surface area of the copper based powder may be between 0.6 and 0.9 $mm^2/g$.

Furthermore, in the piston ring, rate of area on the surface of the surface coating film occupied by the copper based powder may be between 6 and 74%.

Furthermore, in the piston ring, the heat-resistant resin may be polyamide-imide resin.

Furthermore, for the piston ring, on the surface of the piston ring main body where the surface coating film is formed, chemical conversion treatment may be performed.

Furthermore, in the piston ring, the heat-resistant resin may include a solid lubricant comprising one selected from molybdenum disulfide, tungsten disulfide, and graphite, and rate of content of the lubricant in the whole of the surface coating film may be between 1 and 10% by mass.

Effect of the Invention

According to the present invention, because on either of an upper surface or lower surface of a piston ring, or both of the surfaces, a surface coating film comprising heat-resistant resin and copper based powder has been formed, it is possible to prevent a part of ring groove of aluminum alloy piston from separation to be adhered to the piston ring.

In the above-mentioned wear resistance measures for piston ring groove, in other words, prevention of aluminum adhesion (refer to Description of the Related Art), surface coating film which includes solid lubricant is formed on the surface of the piston ring main body for the purpose of providing lubricity thereto. However, the present invention has a characteristic that a surface coating film containing copper based powder, instead of solid lubricant, is formed.

Conventionally, as a method to reduce wear of piston ring groove as much as possible, improvement of lubricity on the surface of the piston ring has been targeted. This is because when lubricity on the surface of the piston ring is improved, aggressiveness of the piston ring toward piston ring groove can be reduced by that much and as a result, wear of the piston ring groove can be prevented.

However, although this method has no problems in its early stage when the surface coating film which contributes to lubricity sufficiently exists, after a long period of time passes, the surface coating film itself has a high possibility of being separated and after wear or separation, there remains no more lubricity, leading wear of a piston ring groove by the exposed piston ring itself.

The applicant of the present application focused on this point and to solve this problem, the applicant reached a conclusion to ensure lubricity by heat-resistant resin that constitutes a surface coating film and, at the same time, for the purpose of retaining lubricity for a longer period of time, to mix copper based powder dispersively in the surface coating film so that wear resistance property is added to the surface coating film by the copper based powder. In other words, the idea of the present invention is different from that of the conventional ones. Major role of copper based powder in the present invention is to add heat-resistant and wear resistance properties to protect the surface coating film.

According to the present invention as described above, because it becomes possible to add lubricity on the surface of a piston ring by heat-resistant resin that constitutes a surface coating film while adding wear resistance property by copper based powder to the surface coating film formed on the surface of the piston ring, it is possible to keep lubricity given by the heat-resistant resin for a long period of time.

DESCRIPTION OF REFERENCE NUMERALS 1, 60—piston ring
2—upper surface of a piston groove
3—lower surface of a piston groove
10—piston
61—piston ring main body
62—surface coating film
63—heat-resistant resin
64—copper based powder

THE BEST MODE FOR CARRYING OUT THE CLAIMED INVENTION

Hereafter, descriptions will be given in detail regarding a piston ring of the present invention with reference to drawings.

Figure 6:
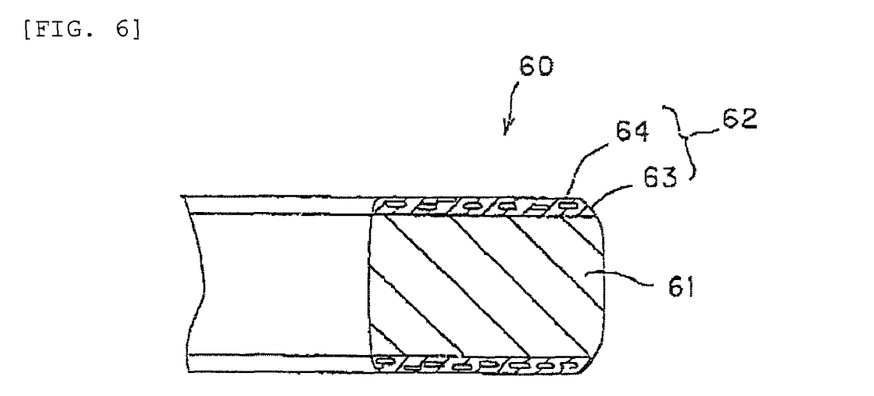
FIG. 6 This is a cross-sectional view of a piston ring of the present invention.

FIG. 6 is a cross-sectional view of a piston ring of the present invention.

Figure 7:
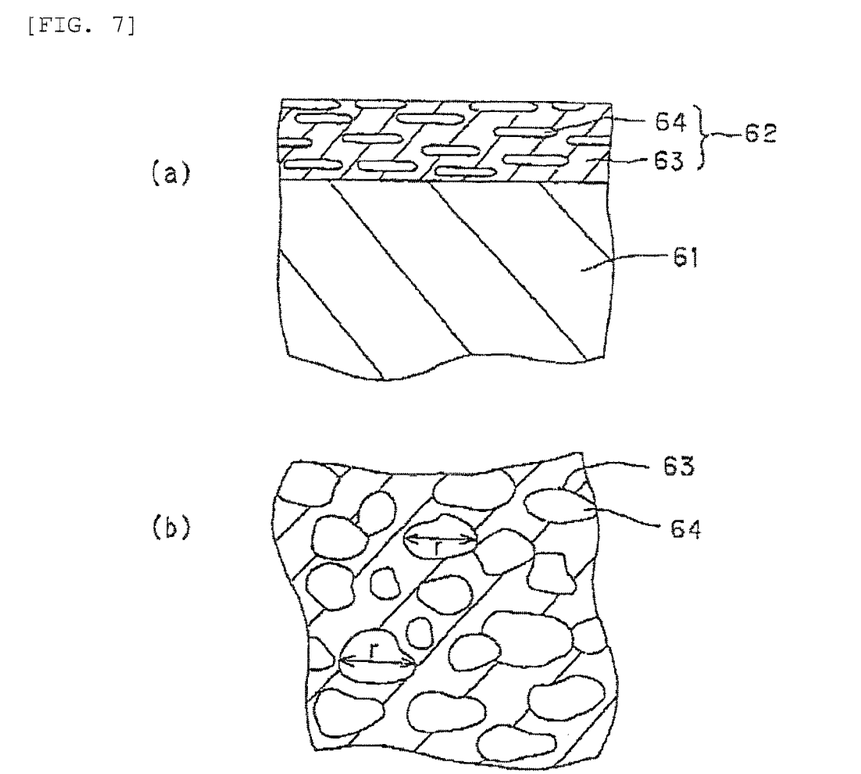
FIG. 7 (a) is an enlarged cross-sectional view of the vicinity of an upper surface of the piston ring shown in FIG. 6 and (b) is an enlarged elevation view of the piston ring shown in FIG. 6.

FIG. 7 (a) is an enlarged cross-sectional view of the vicinity of an upper surface of the piston ring shown in FIG. 6 and (b) is an enlarged elevation view of the piston ring shown in FIG. 6.

As shown in FIG. 6, a piston ring 60 of the present invention includes a piston ring main body 61 and a surface coating film 62 which is formed on either upper or lower surface, or both of the surfaces (in FIG. 6, on both surfaces) of the piston ring main body 61.

As material for the piston ring main body 61 of the present invention, any material can be used without limitation. For example, as material thereof, steel can be mainly used and among stainless steels, SUS 440, SUS 410, SUS 304 or the like, or 8Cr steel, 10Cr steel, SWOSC-V, SWRH or the like can be used. Moreover, as for the types of a piston ring, the piston ring main body 61 can be applied for a top ring which functions as a so-called compression ring and as a second ring, which is also a compression ring, and furthermore, can be applied for an oil ring.

As shown in FIGS. 6 and 7, on the surface of the piston ring 61 of the present invention, a surface coating film that includes a heat-resistant resin 63 and copper based powder 64 contained in the heat-resistant resin 63 is formed.

The heat-resistant resin 63 mainly aims at providing lubricity to the surface of the piston ring, while the copper based powder 64 provides wear resistance property to the surface coating film 62 in which the copper based powder 64 is included, aiming at retaining lubricity provided by the heat-resistant resin for a long period of time.

As the heat-resistant resin 63 that constitutes the surface coating film 62 of the present invention, any resin that can endure the environment (temperature) in which the piston ring is used, has lubricity, and can retain and fix later-described copper based powder can be used. Specifically, polyamide-imide (PAI) resin or polyimide (PI) resin can be listed.

Meanwhile, as the copper based powder 64 which constitutes the surface coating film 62 of the present invention, other than pure copper powder, various types of copper based powder such as powder of copper oxide or copper alloy (for example, brass alloy) can be used. However, in the present invention, hardness of the copper based powder should not be too high because the copper based powder has a role to prevent wear of the heat-resistant resin while it should avoid attacking a piston ring groove which is a counterpart material. From such a viewpoint, as material of the copper based powder, pure copper or copper oxide is preferable.

Shape of the copper based powder 64 is not limited specifically in the present invention and it may be fixed form-shaped, polygonal, or amorphous. However, as mentioned in the description of the material of the copper based powder, attack on the piston ring groove which is a counterpart material by the copper based powder 64 must be avoided and from such a viewpoint, polygonal shape is not preferable and as shown in FIG. 7, scale-like shape is preferable. By adopting scale-like shape for the copper based powder 64 and arranging it to be accumulated in the thickness direction of the surface coating film as shown in FIG. 7, it becomes possible to prevent a piston ring groove from being damaged.

When the shape of the copper based powder 64 is set to be scale-like one, the size thereof is not especially limited. However, it is preferable that an average diameter thereof is between 8 and 12 μm. When an average diameter is less than 8 μm, cost for miniaturizing copper based powder becomes high, while when it is larger than 12 μm, there is a possibility that a piston ring groove which is a counterpart material is attacked. Note that diameter of the scale-like shaped copper based powder is the length of reference coder in FIG. 7 (b) and means length of long axis of a scale.

Moreover, it is preferable that when the copper based powder 64 is set to be scale-like shape, specific surface area of the copper based powder is between 0.6 and 0.9 mm$^2$/g. When the specific surface area is less than 0.6 mm$^2$/g, adhesiveness between the heat-resistant resin 63 and the copper based powder 64 may become bad (in other words, there may be a case where the copper based powder is not fixed by the heat-resistant resin), while when the specific surface area is larger than 0.9 mm$^2$/g, the copper based powder becomes too large and there is a possibility that a piston ring groove which is a counterpart material is attacked. Note that the specific surface area in the present invention means a surface area per 1 gram of copper based powder and is a value measured by air permeability method.

Although the rate of content of the copper based powder 64 in the heat-resistant resin 63 of the surface coating film 62 constituting a piston ring of the present invention can be appropriately set with a balanced ratio by which the heat-resistant resin 63 can sufficiently show lubricity thereof and the copper based powder 64 can sufficiently show wear resistance properties thereof, specifically, it is preferable to set the rate of content of the copper based powder 64 in the whole of the surface coating film 62 to be between 20 and 80% by mass and it is especially preferable to set it to be 50% by mass. When the rate of content of the copper based powder is less than 20% by mass, decrease and annihilation of the surface coating film by friction cannot be effectively prevent and also aluminum adhesion cannot be sufficiently prevented. On the other hand, when the rate of content of the copper based powder exceeds 80% by mass, flexibility of the surface coating film is lowered as a whole and at the same time, it become difficult to fix the copper based powder by heat-resistant resin and may result in elimination of the copper based powder.

It is preferable that a solid lubricant comprising one selected from molybdenum disulfide, tungsten disulfide, and graphite is included in the heat-resistant resin 63. Thus, by adding a small amount of solid lubricant, it becomes possible to fit the heat-resistant resin more to aluminum adhesion in an early stage of use. As a specific content, it is preferable to set the content of the solid lubricant in the whole of the surface coating film 62 to be between 1 and 10% by mass (in this case, if the content of the copper based powder 64 is between 20 and 80% by mass, the rest is for heat-resistant resin). By forming a surface coating film which includes solid lubricant as well as copper based powder on upper and lower surfaces of a piston ring, the surface coating film fits better with the material of the piston which is made of aluminum material in the early stage of use while improving wear resistance properties of the film and, as a result, aluminum adhesion is prevented and a piston ring having superior durability can be provided. Though not shown in FIG. 7, it is preferable that the solid lubricant is uniformly dispersed in the heat-resistant resin 63.

It is preferable that rate of area on the surface of the surface coating film 62 occupied by the copper based powder 64 which constitutes a piston ring of the present invention (refer to FIG. 7 (b)) is between 6 and 74%. By limiting the rate of area within this range, balance between the heat-resistant resin 63 and the copper based powder 64 becomes good and effects of both of them can be sufficiently realized.

Method for forming the surface coating film 62 of the present invention is not limited especially and for example, the copper based powder 64 may be included in polyamide-imide resin and the mixture may be applied on the surface of the piston ring main body 61 by spray coating, dip coating, electrostatic coating or the like. Moreover, depending on necessity, the surface coating film 62 may be performed after treatment such as heat baking.

It is preferable that the thickness of the surface coating film thus formed in the present invention is, for example, between about 3 and 20 μm.

Moreover, in a stage before forming the surface coating film 62, on a surface of the piston ring main body 61 where the surface coating film 62 is to be formed, chemical conversion treatment may be performed as a pretreatment. As chemical conversion treatment, for example, phosphatization, more specifically, manganese phosphate treatment can be listed. By performing phosphatization, it becomes possible to improve adhesiveness of surface of the piston ring main body 61 and the surface coating film 62.

EXAMPLES

A piston ring of the present invention will be more specifically described by using examples.

Examples 1 to 46

Comparative Examples 1 to 86

Members equivalent to a piston ring main body were prepared by use of following two types of material.
  10Cr material—C: 0.5% by mass, Si: 0.2% by mass, Mn: 0.3% by mass, P: 0.02% by mass, S: 0.01% by mass, Cr: 10.2% by mass, the rest are Fe and unavoidable impurities (Examples 1 to 23, Comparative Examples 1 to 38).
  Material equivalent to JIS SWOSC-V—C: 0.55% by mass, Si: 1.4% by mass, Mn: 0.6% by mass, P: 0.02% by mass, S: 0.02% by mass, Cr: 0.65% by mass, Cu: 0.08% by mass, the rest are Fe and unavoidable impurities (Examples 24 to 46, Comparative Examples 39 to 86).

On both the upper and lower surfaces of the members made of the two materials, a surface coating film having a thickness of 10 μm has been formed by spraying method using polyamide-imide resin as heat-resistant resin and scale-like shape copper powder (purity 99.5%) as copper based powder. Note that an average particle diameter of the scale-like copper based powder used here is 9 μm and the additive amount of the copper based powder to the whole of the surface coating film is shown in Tables 1 and 2. Moreover, there are examples in which molybdenum disulfide, tungsten disulfide, or graphite has been added as solid lubricant and additive amount thereof are shown in Tables 1 and 2. In addition, in the case where material equivalent to JIS SWOSC-V was used as the member, chemical conversion treatment was performed on the surface where the surface coating film is to be formed by use of manganese phosphate (refer to Table 2). Each of the piston ring specimen formed as such are called Examples 1 to 46 and Comparative Examples 1 to 76 (refer to Tables 1 and 2). Furthermore, for Comparative Examples 77 to 86, material equivalent to JIS SWOSC-V was used as the member and on both the upper and lower surfaces thereof, a surface coating film including polyamide-imide resin that contains $MoS_2$, $WS_2$, or graphite, which has been conventionally used, was formed with a thickness of 5 μm. Here, an average particle diameter of solid lubricant added is between 1 and 7 μm.

Enlarged photos of a cross-section and surface of a specimen of a piston ring of Example 24 were taken. The results are shown in FIGS. 8 and 9.

Figure 8:
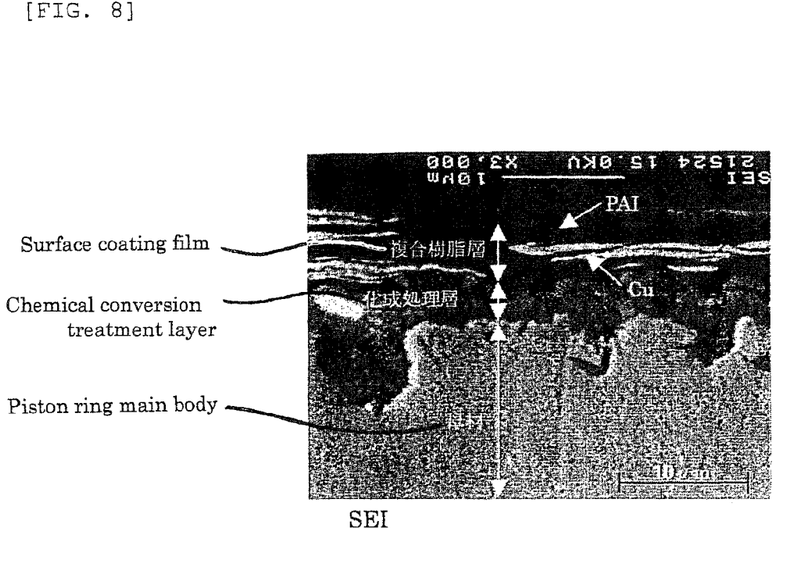
FIG. 8 This is an enlarged photo of a cross section of a piston ring of an embodiment example 24.
Figure 9:
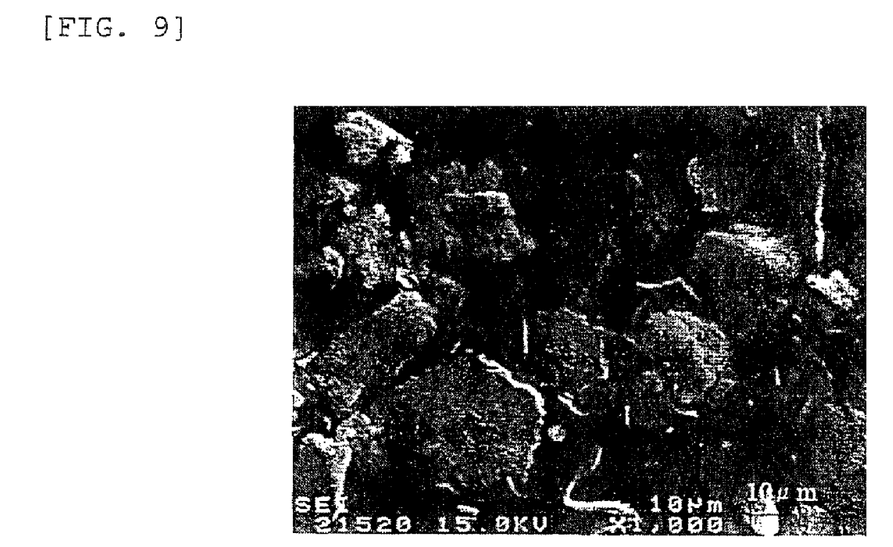
FIG. 9 This is an enlarged photo of a surface of the piston ring of an embodiment example 6.

In FIG. 8, compound resin layer is the surface coating film 62 shown in FIGS. 6 and 7. In FIG. 8, PAI indicates the heat-resistant resin layer 63 including polyamide-imide resin and in FIG. 8, Cu indicates the copper based powder 64.

Moreover, for Examples 1 to 46 and Comparative Examples 1 to 86, attack test with sliding was performed.

Figure 10:
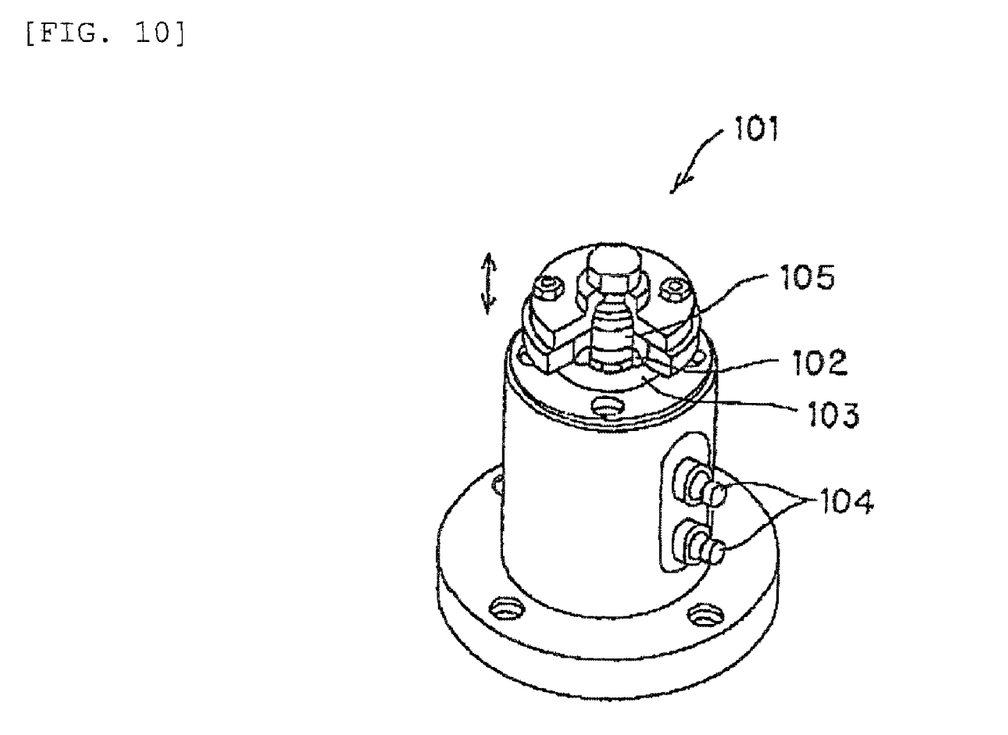
FIG. 10 This is a view showing a high temperature valve seat wear test device.

This test was performed by use of a high temperature valve seat wear test device 101 shown in FIG. 10. Test conditions were: stroke: 4 mm, repeating speed: 500 times/min, ring rotation number: 3 rpm, test time: 7 hrs, piston temperature: about 250° C., piston material: aluminum alloy (AC8A).

Note that the attack test with sliding is performed by fixing a piston material 103 so that it cannot move in the shaft direction toward a test device 101, concentrically mounting a piston ring specimen 102 on the piston material 103 and having a cast iron round bar 105 which is provided on the inner surface side of the piston ring specimen 102 reciprocated in a shaft direction and is a test method in which the piston ring specimen 102 is rotated while attacking the piston material 103. The test device 101 has a heater 104 for heating a test subject and can recreate high-temperature condition of combustion in an engine. Therefore, change of condition of the piston materials can be simulated.

By the test, amount of wear on piston side and piston ring side were evaluated. Note that the amount of wear was calculated by measuring unevenness by a surface roughness meter setting the amount of wear Comparative Example 5 as 100.

Evaluation results are shown in Tables 1 and 2.

As apparent from comparison between the Examples 1 to 46 and the Comparative Examples 77 to 86, which are conventional ones, there is no aluminum adhesion found in piston ring specimens of the Examples of the present invention. Moreover, as apparent by comparison between the Examples 1 to 10 and the Comparative Examples 1 to 4, when additive amount of copper based powder was 15%, aluminum adhesion occurred. Furthermore, when the additive amount of copper based powder was 90%, there was no aluminum adhesion but since the effect of the copper based powder becomes large, amount of wear on piston is, when compared with the Comparative Example 5 as a conventional art, not preferable. From these results, it is understood that additive amount of 20 to 80% is preferable for copper based powder.

TABLE 1

| material of piston ring main body | type of pre-treatment | additive amount of the Cu based powder (% by mass) | rate of area occupied by the Cu based powder | additive amount of solid lubricant (% by $MoS_2$ | $WS_2$ | graphite | piston temperature (° C.) | test time (h) | tack test with sliding alumi- num adhe- sion | result of attack test with sliding rate of abra- sion amount of piston | rate of abrasion amount of piston ring | total evalu- ation | remark |
|---|---|---|---|---|---|---|---|---|---|---|---|---|---|
| example 1 | 10Cr | no | 20 | 6 | ☐ | ☐ | ☐ | 250 | 7 | no | 97 | 89 | ○ | |

TABLE 1-continued

| | material of piston ring main body | type of pre-treatment | additive amount of the Cu based powder (% by mass) | rate of area occupied by the Cu based powder | additive amount of solid lubricant (% by MoS₂ | WS₂ | graph-ite | tack test with sliding piston tem-pera-ture (° C.) | test time (h) | alumi-num adhe-sion | result of attack test with sliding rate of abra-sion amount of piston | rate of abrasion amount of piston ring | total evalu-ation | remark |
|---|---|---|---|---|---|---|---|---|---|---|---|---|---|---|
| example 2 | material | no | 40 | 30 | ☐ | ☐ | ☐ | 250 | 7 | no | 93 | 87 | ○ | |
| example 3 | | no | 60 | 57 | ☐ | ☐ | ☐ | 250 | 7 | no | 93 | 85 | ○ | |
| example 4 | | no | 70 | 65 | ☐ | ☐ | ☐ | 250 | 7 | no | 92 | 82 | ○ | |
| example 5 | | no | 80 | 74 | ☐ | ☐ | ☐ | 250 | 7 | no | 91 | 81 | ○ | |
| comparative example 1 | | no | 15 | 4 | ☐ | ☐ | ☐ | 250 | 7 | found | 91 | 89 | X | |
| comparative example 2 | | no | 90 | 80 | ☐ | ☐ | ☐ | 250 | 7 | no | 100 | 73 | Δ | |
| example 6 | | no | 20 | 6 | 1 | ☐ | ☐ | 250 | 7 | no | 97 | 77 | ◎ | |
| example 7 | | no | 50 | 44 | 1 | ☐ | ☐ | 250 | 7 | no | 95 | 75 | ◎ | |
| example 8 | | no | 80 | 74 | 1 | ☐ | ☐ | 250 | 7 | no | 91 | 72 | ◎ | |
| example 9 | | no | 20 | 6 | 10 | ☐ | ☐ | 250 | 7 | no | 96 | 79 | ◎ | |
| example 10 | | no | 50 | 44 | 10 | ☐ | ☐ | 250 | 7 | no | 94 | 76 | ◎ | |
| example 11 | | no | 80 | 74 | 10 | ☐ | ☐ | 250 | 7 | no | 92 | 73 | ◎ | |
| comparative example 3 | | no | 20 | 6 | 0.5 | ☐ | ☐ | 250 | 7 | no | 97 | 88 | ○ | |
| comparative example 4 | | no | 50 | 44 | 0.5 | ☐ | ☐ | 250 | 7 | no | 95 | 86 | ○ | |
| comparative example 5 | | no | 80 | 74 | 0.5 | ☐ | ☐ | 250 | 7 | no | 91 | 83 | ○ | |
| comparative example 6 | | no | 20 | 6 | 12 | ☐ | ☐ | 250 | 7 | no | 96 | 95 | Δ | |
| comparative example 7 | | no | 50 | 44 | 12 | ☐ | ☐ | 250 | 7 | no | 94 | 93 | Δ | |
| comparative example 8 | | no | 80 | 74 | 12 | ☐ | ☐ | 250 | 7 | no | 90 | 91 | Δ | |
| comparative example 9 | | no | 15 | 4 | 0.5 | ☐ | ☐ | 250 | 7 | found | 91 | 89 | X | |
| comparative example 10 | | no | 15 | 4 | 1 | ☐ | ☐ | 250 | 7 | found | 91 | 89 | X | |
| comparative example 11 | | no | 15 | 4 | 10 | ☐ | ☐ | 250 | 7 | found | 90 | 90 | X | |
| comparative example 12 | | no | 15 | 4 | 12 | ☐ | ☐ | 250 | 7 | found | 90 | 90 | X | |
| comparative example 13 | | no | 90 | 80 | 0.5 | ☐ | ☐ | 250 | 7 | found | 100 | 72 | X | |
| comparative example 14 | | no | 90 | 80 | 1 | ☐ | ☐ | 250 | 7 | found | 100 | 72 | X | |
| example 12 | | no | 20 | 6 | ☐ | 1 | ☐ | 250 | 7 | no | 97 | 78 | ◎ | |
| example 13 | | no | 50 | 44 | ☐ | 1 | ☐ | 250 | 7 | no | 94 | 76 | ◎ | |
| example 14 | | no | 80 | 74 | ☐ | 1 | ☐ | 250 | 7 | no | 90 | 72 | ◎ | |
| example 15 | | no | 20 | 6 | ☐ | 10 | ☐ | 250 | 7 | no | 95 | 78 | ◎ | |
| example 16 | | no | 50 | 44 | ☐ | 10 | ☐ | 250 | 7 | no | 94 | 76 | ◎ | |
| example 17 | | no | 80 | 74 | ☐ | 10 | ☐ | 250 | 7 | no | 91 | 74 | ◎ | |
| comparative example 15 | | no | 20 | 6 | ☐ | 0.5 | ☐ | 250 | 7 | no | 96 | 88 | ○ | |
| comparative example 16 | | no | 50 | 44 | ☐ | 0.5 | ☐ | 250 | 7 | no | 95 | 87 | ○ | |
| comparative example 17 | | no | 80 | 74 | ☐ | 0.5 | ☐ | 250 | 7 | no | 91 | 84 | ○ | |
| comparative example 18 | | no | 20 | 6 | ☐ | 12 | ☐ | 250 | 7 | no | 97 | 93 | Δ | |
| comparative example 19 | | no | 50 | 44 | ☐ | 12 | ☐ | 250 | 7 | no | 95 | 94 | Δ | |
| example 18 comparative example 20 | | no | 80 | 74 | ☐ | 12 | ☐ | 250 | 7 | no | 92 | 92 | Δ | |
| comparative example 21 | | no | 15 | 4 | ☐ | 0.5 | ☐ | 250 | 7 | found | 92 | 89 | X | |
| comparative example 22 | | no | 15 | 4 | ☐ | 1 | ☐ | 250 | 7 | found | 92 | 90 | X | |
| comparative example 23 | | no | 15 | 4 | ☐ | 10 | ☐ | 250 | 7 | found | 91 | 90 | X | |
| comparative example 24 | | no | 15 | 4 | ☐ | 12 | ☐ | 250 | 7 | found | 90 | 91 | X | |
| comparative example 25 | | no | 90 | 80 | ☐ | 0.5 | ☐ | 250 | 7 | found | 100 | 75 | X | |
| comparative example 26 | | no | 90 | 80 | ☐ | 1 | ☐ | 250 | 7 | found | 99 | 74 | X | |

TABLE 1-continued

| material of piston ring main body | type of pre-treatment | additive amount of the Cu based powder (% by mass) | rate of area occupied by the Cu based powder | additive amount of solid lubricant (% by MoS₂ | WS₂ | graphite | tack test with sliding piston temperature (° C.) | test time (h) | alumi­num adhe­sion | result of attack test with sliding rate of abra­sion amount of piston | rate of abrasion amount of piston ring | total evalu­ation | remark |
|---|---|---|---|---|---|---|---|---|---|---|---|---|---|
| example 18 | no | 20 | 6 | ☐ | ☐ | 1 | 250 | 7 | no | 95 | 77 | ◉ | |
| example 19 | no | 50 | 44 | ☐ | ☐ | 1 | 250 | 7 | no | 94 | 76 | ◉ | |
| example 20 | no | 80 | 74 | ☐ | ☐ | 1 | 250 | 7 | no | 92 | 73 | ◉ | |
| example 21 | no | 20 | 6 | ☐ | ☐ | 10 | 250 | 7 | no | 95 | 78 | ◉ | |
| example 22 | no | 50 | 44 | ☐ | ☐ | 10 | 250 | 7 | no | 93 | 76 | ◉ | |
| example 23 | no | 80 | 74 | ☐ | ☐ | 10 | 250 | 7 | no | 91 | 73 | ◉ | |
| comparative example 27 | no | 20 | 6 | ☐ | ☐ | 0.5 | 250 | 7 | no | 97 | 89 | ○ | |
| comparative example 28 | no | 50 | 44 | ☐ | ☐ | 0.5 | 250 | 7 | no | 95 | 87 | ○ | |
| comparative example 29 | no | 80 | 74 | ☐ | ☐ | 0.5 | 250 | 7 | no | 92 | 85 | ○ | |
| comparative example 30 | no | 20 | 6 | ☐ | ☐ | 12 | 250 | 7 | no | 96 | 95 | Δ | |
| comparative example 31 | no | 50 | 44 | ☐ | ☐ | 12 | 250 | 7 | no | 94 | 93 | Δ | |
| comparative example 32 | no | 80 | 74 | ☐ | ☐ | 12 | 250 | 7 | no | 91 | 92 | Δ | |
| comparative example 33 | no | 15 | 4 | ☐ | ☐ | 0.5 | 250 | 7 | found | 90 | 90 | X | |
| comparative example 34 | no | 15 | 4 | ☐ | ☐ | 1 | 250 | 7 | found | 93 | 89 | X | |
| comparative example 35 | no | 15 | 4 | ☐ | ☐ | 10 | 250 | 7 | found | 92 | 90 | X | |
| comparative example 36 | no | 15 | 4 | ☐ | ☐ | 12 | 250 | 7 | found | 90 | 92 | X | |
| comparative example 37 | no | 90 | 80 | ☐ | ☐ | 0.5 | 250 | 7 | found | 100 | 73 | X | |
| comparative example 38 | no | 90 | 80 | ☐ | ☐ | 1 | 250 | 7 | found | 100 | 75 | X | |

TABLE 2

| material of piston ring main body | type of pretreatment | additive amount of the Cu based powder (% by mass) | rate of area occupied by the Cu based powder | additive amount of solid lubricant (% by mass) MoS₂ | WS₂ | graphite |
|---|---|---|---|---|---|---|
| example 24 | SWOSC-V | chemical conversion treatment | 20 | 6 | ☐ | ☐ | ☐ |
| example 25 | | chemical conversion treatment | 40 | 29 | ☐ | ☐ | ☐ |
| example 26 | | chemical conversion treatment | 60 | 58 | ☐ | ☐ | ☐ |
| example 27 | | chemical conversion treatment | 70 | 66 | ☐ | ☐ | ☐ |
| example 28 | | chemical conversion treatment | 80 | 74 | ☐ | ☐ | ☐ |
| comparative example 39 | | chemical conversion treatment | 15 | 3.5 | ☐ | ☐ | ☐ |
| comparative example 40 | | chemical conversion treatment | 90 | 79 | ☐ | ☐ | ☐ |
| example 29 | | chemical conversion treatment | 20 | 6 | 1 | ☐ | ☐ |
| example 30 | | chemical conversion treatment | 50 | 44 | 1 | ☐ | ☐ |
| example 31 | | chemical conversion treatment | 80 | 74 | 1 | ☐ | ☐ |
| example 32 | | chemical conversion treatment | 20 | 6 | 10 | ☐ | ☐ |
| example 33 | | chemical conversion treatment | 50 | 44 | 10 | ☐ | ☐ |
| example 34 | | chemical conversion treatment | 80 | 74 | 10 | ☐ | ☐ |
| comparative example 41 | | chemical conversion treatment | 20 | 6 | 0.5 | ☐ | ☐ |
| comparative example 42 | | chemical conversion treatment | 50 | 44 | 0.5 | ☐ | ☐ |
| comparative example 43 | | chemical conversion treatment | 80 | 74 | 0.5 | ☐ | ☐ |
| comparative example 44 | | chemical conversion treatment | 20 | 6 | 12 | ☐ | ☐ |
| comparative example 45 | | chemical conversion treatment | 50 | 44 | 12 | ☐ | ☐ |
| comparative example 46 | | chemical conversion treatment | 80 | 74 | 12 | ☐ | ☐ |
| comparative example 47 | | chemical conversion treatment | 15 | 4 | 0.5 | ☐ | ☐ |
| comparative example 48 | | chemical conversion treatment | 15 | 4 | 1 | ☐ | ☐ |
| comparative example 49 | | chemical conversion treatment | 15 | 4 | 10 | ☐ | ☐ |
| comparative example 50 | | chemical conversion treatment | 15 | 4 | 12 | ☐ | ☐ |
| comparative example 51 | | chemical conversion treatment | 90 | 80 | 0.5 | ☐ | ☐ |
| comparative example 52 | | chemical conversion treatment | 90 | 80 | 1 | ☐ | ☐ |

TABLE 2-continued

| | | | | | | | |
|---|---|---|---|---|---|---|---|
| example 35 | | chemical conversion treatment | 20 | 6 | ☐ | 1 | ☐ |
| example 36 | | chemical conversion treatment | 50 | 44 | ☐ | 1 | ☐ |
| example 37 | | chemical conversion treatment | 80 | 74 | ☐ | 1 | ☐ |
| example 38 | | chemical conversion treatment | 20 | 6 | ☐ | 10 | ☐ |
| example 39 | | chemical conversion treatment | 50 | 44 | ☐ | 10 | ☐ |
| example 40 | | chemical conversion treatment | 80 | 74 | ☐ | 10 | ☐ |
| comparative example 53 | | chemical conversion treatment | 20 | 6 | ☐ | 0.5 | ☐ |
| comparative example 54 | | chemical conversion treatment | 50 | 44 | ☐ | 0.5 | ☐ |
| comparvtive example 55 | | chemical conversion treatment | 80 | 74 | ☐ | 0.5 | ☐ |
| comparative example 56 | | chemical conversion treatment | 20 | 6 | ☐ | 12 | ☐ |
| comparative example 57 | | chemical conversion treatment | 50 | 44 | ☐ | 12 | ☐ |
| comparative example 58 | | chemical conversion treatment | 80 | 74 | ☐ | 12 | ☐ |
| comparative example 59 | | chemical conversion treatment | 15 | 4 | ☐ | 0.5 | ☐ |
| comparative example 60 | | chemical conversion treatment | 15 | 4 | ☐ | 1 | ☐ |
| comparative example 61 | | chemical conversion treatment | 15 | 4 | ☐ | 10 | ☐ |
| comparative example 62 | | chemical conversion treatment | 15 | 4 | ☐ | 12 | ☐ |
| comparative example 63 | | chemical conversion treatment | 90 | 80 | ☐ | 0.5 | ☐ |
| comparative example 64 | | chemical conversion treatment | 90 | 80 | ☐ | 1 | ☐ |
| example 41 | | chemical conversion treatment | 20 | 6 | ☐ | ☐ | 1 |
| example 42 | | chemical conversion treatment | 50 | 44 | ☐ | ☐ | 1 |
| example 43 | | chemical conversion treatment | 80 | 74 | ☐ | ☐ | 1 |
| example 44 | | chemical conversion treatment | 20 | 6 | ☐ | ☐ | 10 |
| example 45 | | chemical conversion treatment | 50 | 44 | ☐ | ☐ | 10 |
| example 46 | | chemical conversion treatment | 80 | 74 | ☐ | ☐ | 10 |
| comparative example 65 | | chemical conversion treatment | 20 | 6 | ☐ | ☐ | 0.5 |
| comparative example 66 | | chemical conversion treatment | 50 | 44 | ☐ | ☐ | 0.5 |
| comparative example 67 | | chemical conversion treatment | 80 | 74 | ☐ | ☐ | 0.5 |
| comparative example 68 | | chemical conversion treatment | 20 | 6 | ☐ | ☐ | 12 |
| comparative example 69 | | chemical conversion treatment | 50 | 44 | ☐ | ☐ | 12 |
| comparative example 70 | | chemical conversion treatment | 80 | 74 | ☐ | ☐ | 12 |
| comparative example 71 | | chemical conversion treatment | 15 | 4 | ☐ | ☐ | 0.5 |
| comparative example 72 | | chemical conversion treatment | 15 | 4 | ☐ | ☐ | 1 |
| comparative example 73 | | chemical conversion treatment | 15 | 4 | ☐ | ☐ | 10 |
| comparative example 74 | | chemical conversion treatment | 15 | 4 | ☐ | ☐ | 12 |
| comparative example 75 | | chemical conversion treatment | 90 | 80 | ☐ | ☐ | 0.5 |
| comparative example 76 | | chemical conversion treatment | 90 | 80 | ☐ | ☐ | 1 |
| comparative example 77 | SWOSC-V | no | | | ☐ | ☐ | ☐ |
| comparative example 78 | | no | | | ☐ | 1 | ☐ |
| comparative example 79 | | no | | | ☐ | 10 | ☐ |
| comparative example 80 | | no | | | ☐ | 1 | ☐ |
| comparative example 81 | | no | | | ☐ | 10 | ☐ |
| comparative example 82 | | no | | | ☐ | ☐ | 1 |
| comparative example 83 | | no | | | ☐ | ☐ | 10 |
| comparative example 84 | | no | | | ☐ | 5 | 5 |
| comparative example 85 | | no | | | ☐ | 5 | 5 |
| comparative example 86 | | no | | | ☐ | 5 | 5 |

| | attack test with sliding | | result of attack test with sliding | | | |
|---|---|---|---|---|---|---|
| | piston temperature (° C.) | test time (h) | aluminum adhesion | rate of abrasion amount of piston | rate of abrasion amount of piston ring | total evaluation remark |
| example 24 | 250 | 7 | no | 96 | 87 | ○ |
| example 25 | 250 | 7 | no | 94 | 86 | ○ |
| example 26 | 250 | 7 | no | 93 | 84 | ○ |
| example 27 | 250 | 7 | no | 92 | 82 | ○ |
| example 28 | 250 | 7 | no | 92 | 81 | ○ |
| comparative example 39 | 250 | 7 | found | 92 | 90 | X |
| comparative example 40 | 250 | 7 | no | 100 | 81 | Δ |
| example 29 | 250 | 7 | no | 96 | 76 | ◎ |
| example 30 | 250 | 7 | no | 93 | 73 | ◎ |
| example 31 | 250 | 7 | no | 90 | 72 | ◎ |
| example 32 | 250 | 7 | no | 95 | 75 | ◎ |
| example 33 | 250 | 7 | no | 93 | 76 | ◎ |
| example 34 | 250 | 7 | no | 92 | 74 | ◎ |
| comparative example 41 | 250 | 7 | no | 96 | 87 | ○ |
| comparative example 42 | 250 | 7 | no | 94 | 86 | ○ |
| comparative example 43 | 250 | 7 | no | 92 | 84 | ○ |
| comparative example 44 | 250 | 7 | no | 95 | 94 | Δ |
| comparative example 45 | 250 | 7 | no | 93 | 93 | Δ |
| comparative example 46 | 250 | 7 | no | 91 | 92 | Δ |
| comparative example 47 | 250 | 7 | found | 92 | 88 | X |
| comparative example 48 | 250 | 7 | found | 90 | 88 | X |
| comparative example 49 | 250 | 7 | found | 91 | 90 | X |
| comparative example 50 | 250 | 7 | found | 91 | 92 | X |
| comparative example 51 | 250 | 7 | found | 99 | 74 | X |
| comparative example 52 | 250 | 7 | found | 100 | 74 | X |
| example 35 | 250 | 7 | no | 96 | 77 | ◎ |

TABLE 2-continued

| | | | | | | |
|---|---|---|---|---|---|---|
| example 36 | 250 | 7 | no | 93 | 75 | ◎ |
| example 37 | 250 | 7 | no | 90 | 73 | ◎ |
| example 38 | 250 | 7 | no | 94 | 76 | ◎ |
| example 39 | 250 | 7 | no | 94 | 77 | ◎ |
| example 40 | 250 | 7 | no | 92 | 75 | ◎ |
| comparative example 53 | 250 | 7 | no | 95 | 88 | ○ |
| comparative example 54 | 250 | 7 | no | 94 | 86 | ○ |
| comparvtive example 55 | 250 | 7 | no | 90 | 83 | ○ |
| comparative example 56 | 250 | 7 | no | 96 | 92 | Δ |
| comparative example 57 | 250 | 7 | no | 96 | 93 | Δ |
| comparative example 58 | 250 | 7 | no | 93 | 92 | Δ |
| comparative example 59 | 250 | 7 | found | 92 | 90 | X |
| comparative example 60 | 250 | 7 | found | 93 | 89 | X |
| comparative example 61 | 250 | 7 | found | 92 | 88 | X |
| comparative example 62 | 250 | 7 | found | 90 | 90 | X |
| comparative example 63 | 250 | 7 | found | 100 | 76 | X |
| comparative example 64 | 250 | 7 | found | 98 | 73 | X |
| example 41 | 250 | 7 | no | 94 | 76 | ◎ |
| example 42 | 250 | 7 | no | 94 | 75 | ◎ |
| example 43 | 250 | 7 | no | 93 | 72 | ◎ |
| example 44 | 250 | 7 | no | 95 | 77 | ◎ |
| example 45 | 250 | 7 | no | 92 | 77 | ◎ |
| example 46 | 250 | 7 | no | 92 | 74 | ◎ |
| comparative example 65 | 250 | 7 | no | 96 | 88 | ○ |
| comparative example 66 | 250 | 7 | no | 94 | 88 | ○ |
| comparative example 67 | 250 | 7 | no | 93 | 86 | ○ |
| comparative example 68 | 250 | 7 | no | 95 | 95 | Δ |
| comparative example 69 | 250 | 7 | no | 95 | 94 | Δ |
| comparative example 70 | 250 | 7 | no | 92 | 93 | Δ |
| comparative example 71 | 250 | 7 | found | 91 | 89 | X |
| comparative example 72 | 250 | 7 | found | 93 | 88 | X |
| comparative example 73 | 250 | 7 | found | 93 | 88 | X |
| comparative example 74 | 250 | 7 | found | 91 | 93 | X |
| comparative example 75 | 250 | 7 | found | 100 | 75 | X |
| comparative example 76 | 250 | 7 | found | 100 | 76 | X |
| comparative example 77 | 250 | 7 | found | 100 | 100 | X |
| comparative example 78 | 250 | 7 | found | 98 | 98 | X |
| comparative example 79 | 250 | 7 | found | 97 | 96 | X |
| comparative example 80 | 250 | 7 | found | 98 | 97 | X |
| comparative example 81 | 250 | 7 | found | 96 | 95 | X |
| comparative example 82 | 250 | 7 | found | 97 | 96 | X |
| comparative example 83 | 250 | 7 | found | 95 | 94 | X |
| comparative example 84 | 250 | 7 | found | 96 | 98 | X |
| comparative example 85 | 250 | 7 | found | 98 | 96 | X |
| comparative example 86 | 250 | 7 | found | 96 | 95 | X |

What is claimed is:

1. A piston ring comprising:
a piston ring main body; and
a surface coating film on at least one of i) an upper surface and a lower surface of the piston ring main body, wherein,
the surface coating film comprises heat-resistant resin and copper based powder contained therein,
a rate of content of the copper based powder in the whole of the surface coating film is between 20 and 80% by mass,
the copper based powder is any of the group consisting of pure copper, copper oxide, and copper alloy,
the copper based powder has a scale shape in powder and an average diameter particle thereof is between 8 and 12 μm,
the heat-resistant resin includes a solid lubricant comprising one selected from the group consisting of molybdenum disulfide, tungsten disulfide, and graphite,
a rate of content of the lubricant in the whole of the surface coating film is between 2 and 10% by mass, and
the copper based powder is accumulated in a thickness direction of the surface coating film.

2. The piston ring according to claim 1, wherein the copper based powder has specific surface area between 0.6 and 0.9 mm$^2$/g, as measured by air permeability method.

3. The piston ring according to claim 2, wherein rate of area, on the surface of the surface coating film, occupied by the copper based powder is between 6 and 74%.

4. The piston ring according to claim 2, wherein the heat-resistant resin is polyamide-imide resin.

5. The piston ring according to claim 1, wherein rate of area, on the surface of the surface coating film, occupied by the copper based powder is between 6 and 74%.

6. The piston ring according to claim 5, wherein the heat-resistant resin is polyamide-imide resin.

7. The piston ring according to claim 1, wherein the heat-resistant resin is polyamide-imide resin.

8. The piston ring according to claim 1, wherein on the surface of the piston ring main body on which the surface coating film is formed, chemical conversion treatment is performed.

9. The piston ring according to claim 1, wherein rate of area, on the surface of the surface coating film, occupied by the copper based powder is between 6 and 74%.

10. The piston ring according to claim 1, wherein the heat-resistant resin is polyamide-imide resin.

11. The piston ring according to claim 1, wherein on the surface of the piston ring main body on which the surface coating film is formed, chemical conversion treatment is performed.

12. A piston ring, comprising:
a stainless steel piston ring main body; and
an exterior surface coating film on the piston ring main body, wherein, the surface coating film comprises heat-resistant resin and copper based powder contained within the resin,
a rate of content of the copper based powder in the whole of the surface coating film is between 20 and 80% by mass,
the copper based powder is one of the group consisting of pure copper, copper oxide, and copper alloy,
the copper based powder has a scale shape in powder and an average diameter particle between 8 and 12 μm,
the heat-resistant resin includes a solid lubricant comprising one of the group consisting of molybdenum disulfide, tungsten disulfide, and graphite,
a rate of content of the lubricant in the whole of the surface coating film is between 2 and 10% by mass, and
the copper based powder is accumulated throughout a thickness direction of the surface coating film.

13. The piston ring according to claim 12, wherein the copper based powder has a specific surface area between 0.6 and 0.9 mm$^2$/g, as measured by air permeability method.

14. The piston ring according to claim 13, wherein, in elevation view, the copper based powder covers between 6 and 74% of a surface area.

15. The piston ring according to claim 12, wherein the heat-resistant resin is polyamide-imide resin.

16. The piston ring according to claim 12, wherein on the surface of the piston ring main body on which the surface coating film is formed is a chemical conversion treated surface.

17. The piston ring according to claim 12, wherein a rate of content, on the surface of the surface coating film, occupied by the copper based powder is between 6 and 74%.

18. The piston ring according to claim 12, wherein the rate of content of the copper based powder in the whole of the surface coating film is 50% by mass.

* * * * *